April 17, 1956   J. S. SHUTTLEWORTH   2,741,846
TOOL
Filed Sept. 15, 1954   2 Sheets-Sheet 1

INVENTOR.
JONAS S. SHUTTLEWORTH
BY
Jerome R. Cox
ATTORNEY

April 17, 1956  J. S. SHUTTLEWORTH  2,741,846
TOOL
Filed Sept. 15, 1954  2 Sheets-Sheet 2
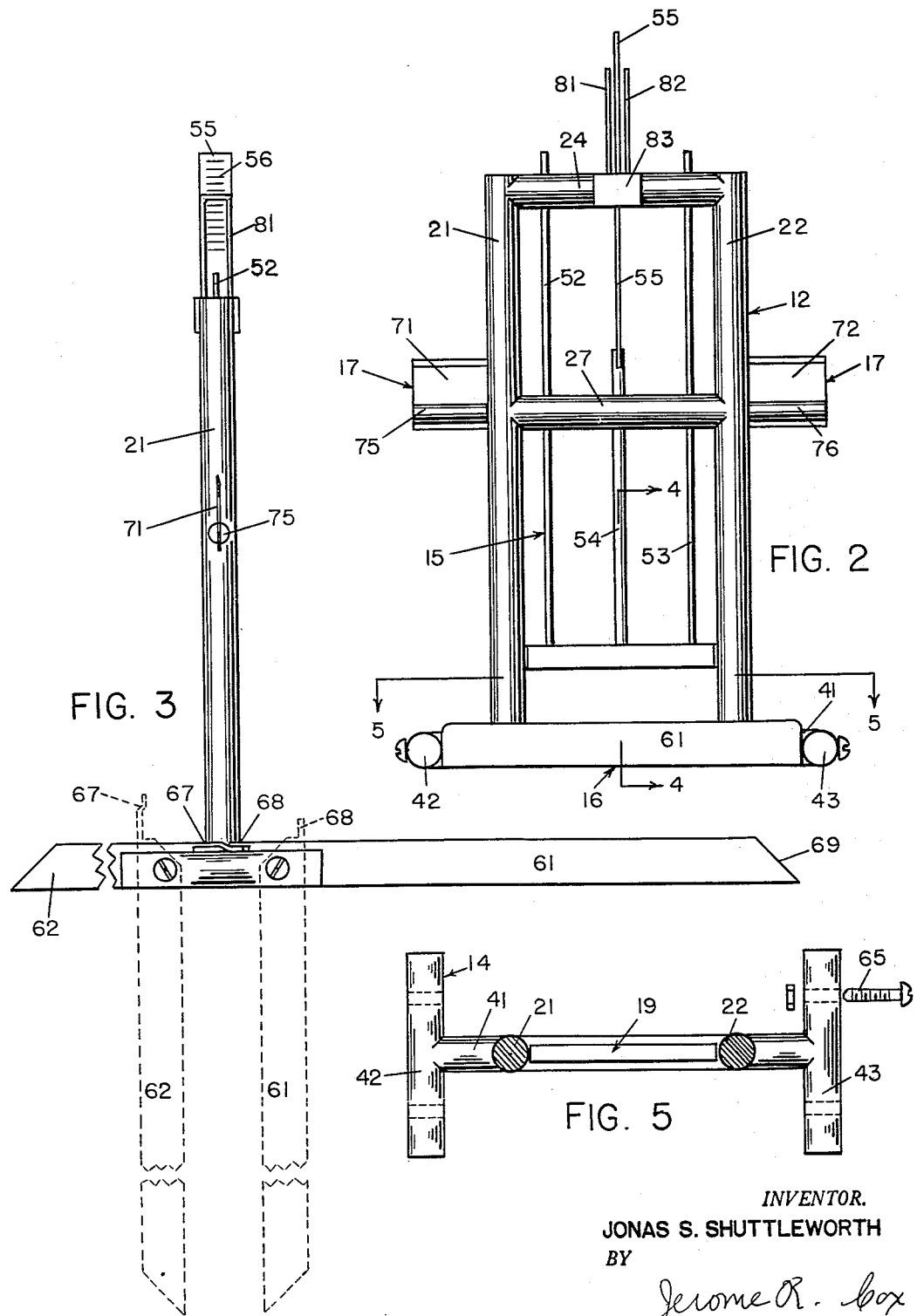
INVENTOR.
JONAS S. SHUTTLEWORTH
BY
Jerome R. Cox
ATTORNEY United States Patent Office 2,741,846
Patented Apr. 17, 1956

2,741,846
TOOL

Jonas S. Shuttleworth, Piqua, Ohio

Application September 15, 1954, Serial No. 456,280

4 Claims. (Cl. 33—143)

The invention disclosed and claimed in this application relates to tools or gauges in general and the embodiment disclosed is a gauge for checking the external diameter of animal casings uesd for sausage, etc.

Heretofore the apparatus or tools used for checking the diameter of animal casings and for assorting such casings have usually been arrangements by which an operator attempts to fit the casings into one of a plurality of semicircular troughs and by trial and error determines which of the sizes is most appropriate for the particular casing. This method of checking the size of the casings is relatively slow an is subject to errors on the part of operators.

More complicated gauges have at times been suggested to overcome these difficulties but have never been accepted to any extent partly for the reason that such devices are cumbersome and difficult to clean, drain, dry and store. I have devised a gauge which overcomes these difficulties. Partly this is due to the simple construction and partly it is due to the arrangement of the supporting base which may be folded when the device is not in use so that the gauge will drain well and can be stored in a limited space.

An object, therefore, of my invention is the improvement in gauges for checking the diameter of such casings.

A further object of my invention is the provision of a gauge which will be accurate regardless of the vagaries of the operator.

A further object of my invention is the provision of a gauge which may be easily cleaned and which, after being cleaned, may be stored and allowed to drain and dry in a relatively small space.

A further object of my invention is the provision in connection with such a gauge of means for cutting the casings into appropriate lengths as they are being measured and sorted for size.

Features of my invention include the provision of an I-frame for supporting the tool steadily, a folding supporting platform for providing a smooth surface on which the casings being measured are supported, a T member for cooperating with said folding flat member for completing the flat surface, an A shaped frame for supporting the measuring devices which is secured firmly to the I-member; a slidable measuring frame reciprocating in said A-frame; and a pair of U-shaped wires serving as an indicator or reading device for determining the size of the casing being measured.

Further objects and features of my invention will be apparent from the subjoined specification and claims which considered in connection with the accompanying drawings illustrating an embodiment of my invention.

In the drawings:

Fig. 2 is an end view in elevation of the gauge shown in Fig. 1;

Fig. 3 is a side view in elevation of the gauge shown in Fig. 1, a portion of one of the folding platforms being broken away;

Fig. 5 is a view in horizontal section taken substantially on the line 5—5 of Fig. 2, the two hinged members of the casing supporting slat assembly or pan having been removed in order to disclose the portions which might otherwise be hidden.

Figure 1:
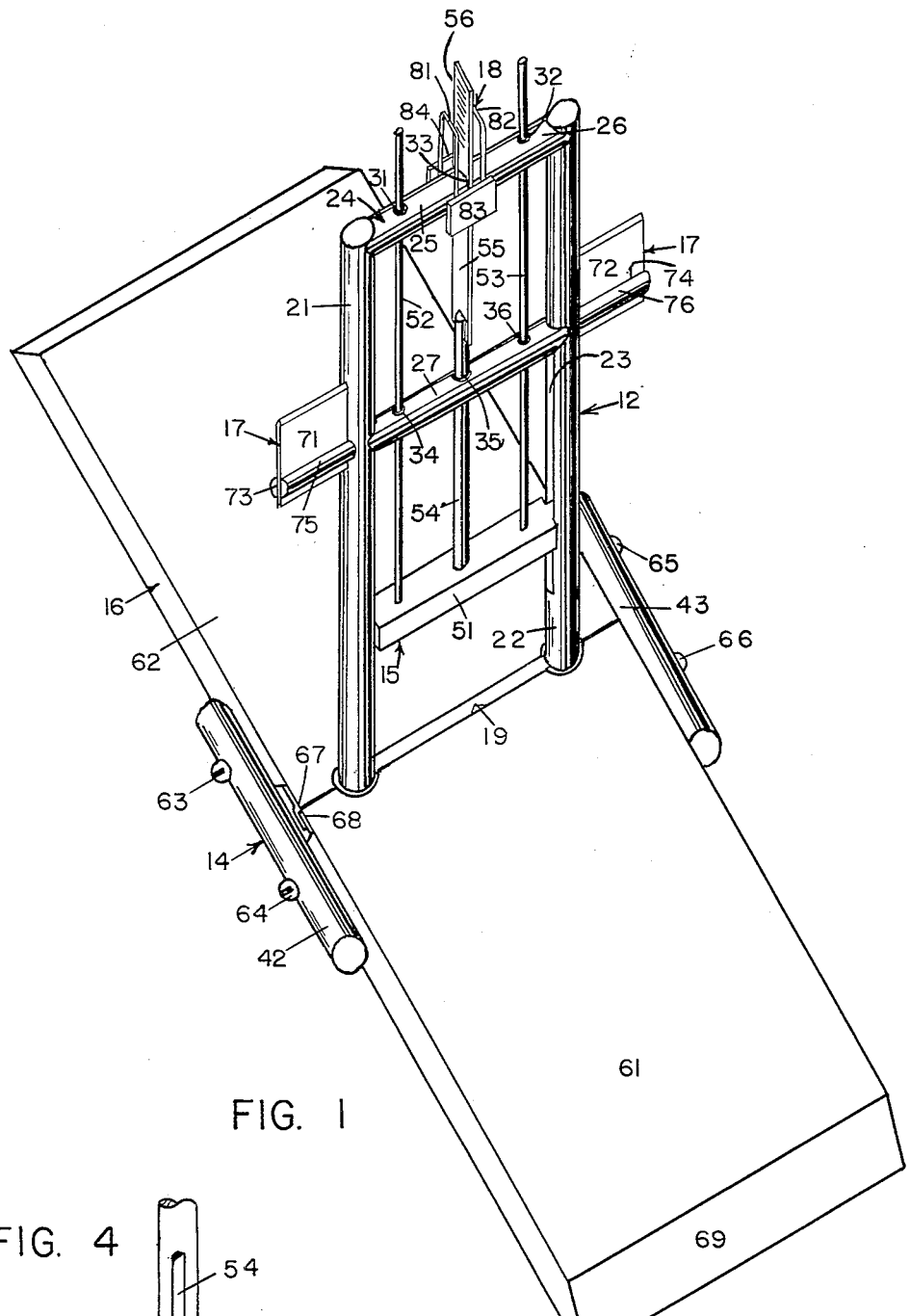
Fig. 1 is a view in perspective of the gauge illustrating my invention.

In order to describe the embodiment disclosed in detail, I refer now specifically to the drawings, and at first especially to Fig. 1. In Fig. 1 I have shown my gauge as comprising essentially an A-frame 12 mounted substantially vertically and supported by an I-frame 14 and carrying a sliding frame 15. Pivotally mounted on the I-frame 14 is a folding, casing supporting, flat assembly or pan 16. Secured to the sides of the A-frame 12 are a pair of cutting members or edges 17 and carried by the upper part of the A-frame 12 is an indicator or reading arrangement 18 which consists of a pair of wires later to be more fully described. Filling the opening between the members of the folding, casing supporting, flat assembly 16 is a T-member 19 which will be later more fully described.

The A-frame 12 is formed by a pair of vertical rods 21 and 22 each of which has a keyway formed on the inner side thereof such as the keyway 23 shown in the rod 22. Connecting the upper ends of the rods 21 and 22 is a horizontal connecting unit 24. This may, if desired, be one continuous member formed with a slit at an intermediate portion. It may, as shown in Fig. 1, be formed of a pair of rods positioned end to end and separated slightly at their point of meeting so as to form a slit centrally of the unit for purposes to be described. The two rods 25 and 26 are joined by the indicator assembly 18 as will be later more fully described. I also provide an intermediate horizontal connecting rod 27 which is secured at its opposite ends to intermediate points of the upright rods 21 and 22. Vertical openings are formed in the rods 24 and 27 for purposes later to be described. The unit 24 has the opening 31, the opening 32 and the slit 33. The rod 27 has the openings 34, 35 and 36.

The lower end of the A-frame 12 is connected by a longer horizontal rod 41 which forms a portion of the supporting I-frame. At the two ends of the rod 41 there are secured respectively rods 42 and 43.

The rods 21, 22, 25, 26, 27, 41, 42 and 43 are shown of round metal stock, but obviously may be of rectangular or any other suitable shape or material such as plastic, for example.

Within the A-frame 12, I mount the sliding measuring frame 15. This frame consists of the reciprocating casing contacting member 51, a pair of guide rods 52 and 53, an actuating rod 54 and a scale bar 55. The scale bar 55 is connected to the upper end of the actuating rod 54 and is provided at its upper end with scale markings 56. The guide rod 52 passes through the opening 34 in the rod 27 and through the opening 31 in the rod 25. The guide rod 53 passes through the opening 36 in the rod 27 and through the opening 32 in the rod 26.

The folding, casing supporting, flat assembly or pan 16 consists of a flat member 61 and a flat member 62 which may be formed from a sheet metal, as shown, or of plastic, or any other suitable material. Both of these members 61 and 62 are pivoted for movement from their operating horizontal position as shown in full lines in Figs. 1 and 3 to a non-operating or a draining position as shown in dotted lines in Fig. 3. The member 61 is pivoted on a bolt 64 and upon a bolt 66. The bolt 64 extends through a hole in the rod 42 and a hole in the turned down side of the member 61. The bolt 66 extends through a hole in the rod 43 and through a hole in the other side of the member 61. The member 62 is pivoted on a bolt 63 and a bolt 65. The bolt 63 extends through a hole in the rod 42 and through a hole in a turned down side portion of the member 62. The bolt 65 extends through a hole in the rod 43 and through a hole in a turned down side portion of the member 62. Interlocking projections 67 and 68, shown most clearly in Fig. 3, are so constructed and arranged that while the members 61 and 62 may be dropped to the dotted line position shown in Fig. 3, those members may not be raised above the exact horizontal and thus provide a flat and unvarying casing supporting surface on which the casings may be measured. The ends of the members 61 and 62 are beveled as shown at 69, for example.

I provide the cutting assemblies 17 consisting of a pair of cutting blades 71 and 72 clamped in slits 73 and 74 of screws 75 and 76. It is obvious that these blades may be easily slipped into the slits when the screws are removed from the rods 21 and 22, but as the screws are inserted in and screwed into the openings in the tubes, the slits clamp the blades firmly in position.

The indicating or reading mechanism 18 consists of a pair of U-shaped wires 81 and 82 which are secured to the rods 25 and 26 by plates 83 and 84 which are soldered or otherwise secured to the rods. The plates also, as they are secured to the rods 25 and 26, secure these members to each other and can cause these members to be essentially a single member or unit 24 formed with a slot 33.

The scale bar 55 may be removed and a different scale bar substituted in order to adapt the gauge for different sized casings if desired.

Figure 4:
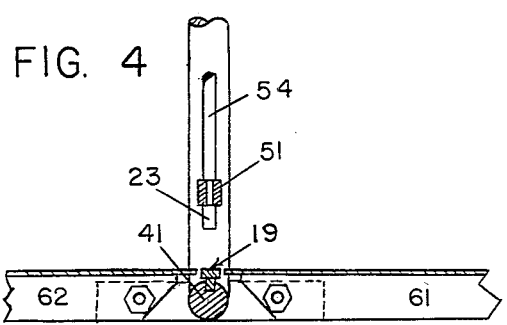
Fig. 4 is a view in vertical section taken substantially on the line 4—4 of Fig. 2.

In order to fill the opening between the two flat members 61 and 62 at the critical point where the casing is to be measured, I provide a T-member 19 which consists of a flat member flush with the surfaces of the members 61 and 62 and a tongue which is embedded in a groove at the upper end of the lower horizontal connecting rod 41 of the I-frame 14, as best shown in Figs. 4 and 5.

It is to be understood that the above described embodiments of my invention are for the purpose of illustration only and various changes may be made therein without departing from the spirit and scope of my invention.

I claim:

1. A gauge for checking external diameters of meat casings including a tubular frame comprising a pair of generally vertical members each having on its under side a keyway, a plurality of horizontal connecting members secured to and rigidly connecting said vertical members, some of the connecting members being formed with vertical openings, and a pair of end horizontal members secured to and arranged perpendicular to the ends of the lowermost of the connecting members; a pair of inverted U-shaped indicator wires secured to said frame; a folding supporting flat frame consisting of a pair of flat members hinged to said end horizontal members and having interlocking projections constraining them against movement above their horizontal position; and a reciprocating measuring device comprising a frame having a horizontal member extending into said keyway, spaced a variable distance above the flat frame, having a plurality of rigid vertical members secured to said horizontal member and slidable through said vertical openings whereby said horizontal member is maintained parallel to the flat frame, and said measuring device including also a central vertical rod carrying a flat strip each passing through one of said openings and said flat strip being provided with scale markings for cooperation with said indicator wires to show the distance that the horizontal member is spaced above the flat member and to indicate the diameter of the article being measured; the ability to fold the flat frame allowing the gauge to be stored in a small space when not in use and while being hung to drain and dry after cleaning.

2. A gauge for checking external diameters of meat casings including a frame comprising a pair of generally vertical members, a plurality of horizontal connecting members secured to and connecting said vertical members and some of which are formed with vertical openings, and a pair of end horizontal members secured to and arranged perpendicular to the ends of the lowermost of the connecting members; an indicator secured to said frame; a folding supporting flat frame consisting of a pair of flat members hinged to said end members and having interlocking projections constraining them against movement above their horizontal position; and a sliding measuring device comprising a frame having a horizontal member spaced a variable distance above the flat frame, having vertical members slidable through said vertical openings, and provided with scale markings for cooperation with said indicator to show the distance that the horizontal said member is spaced above the flat member and to indicate the diameter of the article being measured; the ability to fold the flat frame allowing the gauge to be stored in a small space when not in use and while being hung to drain and dry after cleaning.

3. In combination a meat casing measuring device comprising an I-shaped base; a vertical member in the form of a block A having upper and intermediate cross arms each formed with openings integrally attached to the I-shaped base, and forming a rigid frame; a reciprocating member having each end contained in a keyway in each upright member of the vertical member; two guide rods integrally attached to the reciprocating member at points substantially near the ends of the reciprocating member, and passing through said openings in the cross arms of the vertical member, so as to cause the reciprocating member to remain parallel to the plane of the base when moving up or down; an actuating rod attached integrally to the reciprocating member and passing through an opening in the intermediate cross arm of the vertical member; a scale bar, attached removably to the actuating bar and passing through an opening in the upper cross arm of the vertical member; wire indicators attached integrally to the upper cross arm and on both sides of the opening through which the scale bar passes; so that when the reciprocating member moves it actuates the actuating arm which in turn actuates the scale bar and the relative displacement of the reciprocating member above the base is indicated on the scale bar by means of the indicators; a relatively thin cutting edge removably attached to an upright member of the vertical member; so that meat casings may be cut when necessary; and a pan, upon which meat casings to be measured rest, pivotally attached to the I-shaped base so that said pan may be folded to lie in a plane parallel to that of the vertical member and thereby facilitate ease of storing the device when not in use.

4. A gauge for checking external diameters of meat casings including a frame comprising a pair of vertical tubular members and a plurality of horizontal members some of the latter being formed with vertical openings; an indicator wire secured to said frame; a folding supporting flat pan upon which the meat casings rest and which consists of a pair of flat members hinged to each other and to said frame on a horizontal axis and having interlocking projections constraining them against movement above their horizontal position so that the said pan may be folded to lie in a plan parallel to that of the vertical members and thereby facilitate ease of storing the device when not in use; and a sliding measuring device having a horizontal member spaced a variable distance above the flat frame, having vertical members slidable through said vertical openings, and provided with scale markings for cooperation with said indicator to indicate the diameter of the article being measured.

References Cited in the file of this patent

UNITED STATES PATENTS

| | | |
|---|---|---|
| 872,271 | Benet | Nov. 26, 1907 |
| 1,333,453 | Sardo | Mar. 9, 1920 |
| 1,631,896 | St. John | June 7, 1927 |